(12) United States Patent
Zhang et al.

(10) Patent No.: US 10,545,392 B2
(45) Date of Patent: Jan. 28, 2020

(54) GIMBAL AND UNMANNED AERIAL VEHICLE AND CONTROL METHOD THEREOF

(71) Applicant: AUTEL ROBOTICS CO., LTD., Shenzhen, Guangdong (CN)

(72) Inventors: Zhengli Zhang, Guangdong (CN); Xiangxi Pan, Guangdong (CN); Songtao Chang, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/242,606

(22) Filed: Jan. 8, 2019

(65) Prior Publication Data

US 2019/0163039 A1 May 30, 2019

Related U.S. Application Data

(63) Continuation of application No. PCT/CN2016/101562, filed on Oct. 9, 2016.

(51) Int. Cl.
*G03B 17/56* (2006.01)
*G03B 15/00* (2006.01)
(Continued)

(52) U.S. Cl.
CPC .......... *G03B 17/561* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| 5,850,136 A | 12/1998 | Kaneko |
| 2016/0381261 A1* | 12/2016 | Bontrager ............. H04N 5/247 |
| | | 348/375 |

(Continued)

FOREIGN PATENT DOCUMENTS

| CN | 101728852 A | 6/2010 |
| CN | 101728852 B | 5/2012 |
| CN | 203747465 U | 7/2014 |
| CN | 104428970 A | 3/2015 |
| CN | 104852438 A | 8/2015 |
| CN | 205195331 U | 4/2016 |

(Continued)

*Primary Examiner* — William B Perkey
(74) *Attorney, Agent, or Firm* — Ladas & Parry LLP

(57) ABSTRACT

The present invention discloses a gimbal including a support, a roll axis motor assembly, a pitch axis motor assembly, a first camera and a second camera. The first camera and the second camera are disposed at two ends of the roll axis motor assembly and face opposite directions. The roll axis motor assembly is configured to drive the first camera and the second camera to rotate around a roll axis of the roll axis motor assembly. The pitch axis motor assembly is mounted on the support and is connected to the roll axis motor assembly and the pitch axis motor assembly is configured to drive the roll axis motor assembly, the first camera and the second camera to rotate round a pitch axis of the pitch axis motor assembly. In the present invention, the two cameras are respectively disposed at the two ends of the roll axis motor assembly and face opposite directions, so that the two cameras can cooperate with each other, so as to obtain a 360-degree panoramic view at a same time, thereby satisfying three-dimensional experience in virtual reality.

18 Claims, 6 Drawing Sheets

(51) Int. Cl.
  *B64D 47/08* (2006.01)
  *B64C 39/02* (2006.01)
  *G05D 1/00* (2006.01)
  *G05D 1/10* (2006.01)
  *F16M 11/18* (2006.01)
  *F16M 11/12* (2006.01)
  *H04N 5/232* (2006.01)

(52) U.S. Cl.
  CPC ........... *F16M 11/123* (2013.01); *F16M 11/18* (2013.01); *G03B 15/006* (2013.01); *G05D 1/0094* (2013.01); *G05D 1/101* (2013.01); *H04N 5/23238* (2013.01); *H04N 5/23299* (2018.08); *B64C 2201/141* (2013.01)

(56) References Cited

U.S. PATENT DOCUMENTS

| | | | |
|---|---|---|---|
| 2017/0195568 A1* | 7/2017 | Leizerovich, Jr. | ............................ H04N 5/23238 |
| 2018/0186472 A1* | 7/2018 | Wan | ......................... B64D 47/08 |
| 2018/0248454 A1* | 8/2018 | Ji | ............................ H02K 7/116 |
| 2018/0297716 A1* | 10/2018 | Ni | ........................... B64D 47/08 |
| 2019/0163039 A1* | 5/2019 | Zhang | ................... G03B 17/561 |

FOREIGN PATENT DOCUMENTS

| | | |
|---|---|---|
| CN | 205544487 U | 8/2016 |
| CN | 105978106 A | 9/2016 |
| CN | 104428970 B | 4/2017 |
| EP | 0851556 A2 | 7/1998 |
| JP | 10-191574 A | 7/1998 |
| WO | 2016/192515 A1 | 12/2016 |

* cited by examiner

GIMBAL AND UNMANNED AERIAL VEHICLE AND CONTROL METHOD THEREOF

CROSS REFERENCE

The present application is a continuation of International Application No. PCT/CN2016/101562, filed on Oct. 9, 2016, which is incorporated herein by reference in its entirety.

TECHNICAL FIELD

The present invention relates to the field of aircraft technologies, and in particular, to a gimbal used for carrying a photographic apparatus on an aircraft and an unmanned aerial vehicle including the gimbal and a control method thereof.

RELATED ART

An existing aerial photography aircraft carries one or more gimbals. A view angle of a camera disposed on the gimbal is generally within 180 degrees. When a 360-degree panoramic image needs to be obtained, photographing at different view angles needs to be implemented by depending on rotation of the gimbal or use of a plurality of gimbals in cooperation.

During implementation of the present invention, an inventor finds that the related art has the following problems: 1. A disadvantage of a manner in which a 360-degree panoramic view is obtained by using a single gimbal through its rotation is that the 360-degree panoramic view cannot be obtained at a same time and three-dimensional experience in virtual reality cannot be satisfied. 2. A disadvantage of a manner in which a plurality of gimbals is used in cooperation is that there is a time difference between photographing of cameras on the gimbals, experience in virtual reality is poor and costs are high.

SUMMARY

To resolve the foregoing technical problems, the present invention provides a gimbal capable of performing simultaneous 360-degree view-finding and an unmanned aerial vehicle including the gimbal and a control method thereof.

To resolve the foregoing technical problems, embodiments of the present invention provide the following technical solution:

A gimbal is provided. The gimbal includes a support, a roll axis motor assembly, a pitch axis motor assembly, a first camera and a second camera. The first camera and the second camera are disposed at two ends of the roll axis motor assembly and face opposite directions and the roll axis motor assembly is configured to drive the first camera and the second camera to rotate around a roll axis of the roll axis motor assembly. The pitch axis motor assembly is mounted on the support and connected to the roll axis motor assembly. The pitch axis motor assembly is configured to drive the roll axis motor assembly, the first camera and the second camera to rotate around a pitch axis of pitch axis motor assembly.

In some embodiments, the roll axis motor assembly includes a roll axis motor stator and a roll axis motor rotor, where the roll axis motor stator is located in the middle of the roll axis motor assembly and is connected to the pitch axis motor assembly, the first camera and the second camera being respectively located at two ends of the roll axis motor rotor and face opposite directions.

In some embodiments, the pitch axis motor assembly includes a pitch axis motor rotor, the roll axis motor stator being fixedly connected to the pitch axis motor rotor.

In some embodiments, the roll axis motor stator is fixedly connected to the pitch axis motor rotor by using a connecting shaft arm; or the roll axis motor stator is fixedly connected to the pitch axis motor rotor directly.

In some embodiments, the pitch axis motor assembly includes a pitch axis motor stator, the pitch axis motor stator being mounted on the support and the pitch axis motor rotor being connected to the roll axis motor assembly.

In some embodiments, the pitch axis motor stator is fixedly connected to the support.

In some embodiments, the pitch axis and the roll axis are perpendicular to each other.

In some embodiments, the first camera includes a first housing and a first lens, the first lens being fixed in the first housing and the first housing being fixed at one end of the roll axis motor rotor.

In some embodiments, the second camera includes a second housing and a second lens, the second lens being fixed in the second housing and the second housing being fixed at the other end of the roll axis motor rotor.

In some embodiments, optical axes of the first camera and the second camera overlap.

In some embodiments, the gimbal further includes a yaw axis motor assembly, the yaw axis motor assembly being mounted on the support and the yaw axis motor assembly being configured to drive the support, the pitch axis motor assembly, the roll axis motor assembly, the first camera and the second camera to rotate around a yaw axis of the yaw axis motor assembly.

In some embodiments, the yaw axis motor assembly includes a yaw axis motor stator and a yaw axis motor rotor, the yaw axis motor rotor being fixedly connected to the support and the yaw axis motor stator is configured to connect to an external base or another device.

In some embodiments, the support includes a transverse arm and a first side arm, the first side arm being connected to the transverse arm; and the gimbal further includes a yaw axis motor assembly, the yaw axis motor assembly being mounted on the transverse arm and one end of the first side arm being connected to the pitch axis motor assembly.

In some embodiments, the yaw axis motor assembly includes a yaw axis motor stator and a yaw axis motor rotor and the pitch axis motor assembly includes a pitch axis motor stator and a pitch axis motor rotor; and the yaw axis motor rotor is fixedly mounted on the transverse arm and one end of the first side arm is fixedly connected to the pitch axis motor stator.

In some embodiments, the support further includes a second side arm, the second side arm being connected to the transverse arm and one end of the second side arm being connected to the roll axis motor assembly.

In some embodiments, the roll axis motor assembly includes a roll axis motor stator and a roll axis motor rotor, one end of the second side arm being movably connected to the roll axis motor stator.

In some embodiments, one side that is of the roll axis motor assembly stator and that is close to the second side arm is provided with a connecting shaft arm and one end of second side arm is provided with a mounting hole, the connecting shaft arm being rotably inserted into the mounting hole.

In some embodiments, one side that is of the roll axis motor assembly stator and that is close to the second side arm is provided with a mounting hole and one end that is of the second side arm and that is far away from the transverse arm is provided with a connecting shaft arm, the connecting shaft arm being rotably inserted into the mounting hole.

To resolve the foregoing technical problems, embodiments of the present invention provide the following technical solution:

An unmanned aerial vehicle is provided. The unmanned aerial vehicle includes a body, a base and the foregoing gimbal, the gimbal being mounted on the body by using the base.

In some embodiments, the unmanned aerial vehicle includes:

a detection assembly, configured to detect and obtain status information of the roll axis motor assembly and the pitch axis motor assembly; and a processor, configured to calculate flight attitude information of the gimbal according to the status information; output one or more motor signals according to the flight attitude information, where the one or more motor signals are used to cause at least one of the roll axis motor assembly and the pitch axis motor assembly to rotate or adjust a rotational speed, so that the first camera and the second camera turn to predefined directions and locations; and control the first camera and the second camera to respectively obtain 180-degree opposite direction image information simultaneously.

In some embodiments, the processor is further configured to control the first camera and the second camera to lock in a particular target or angle; and if the unmanned aerial vehicle is in a moving state or shakes, the processor is further configured to calculate flight attitude information of the gimbal in real-time according to the status information and output one or more motor signals according to the flight attitude information, the one or more motor signals being used to cause at least one of the roll axis motor assembly and the pitch axis motor assembly to rotate correspondingly, so that the first camera and the second camera always lock in the particular target or angle for photographing.

In some embodiments, the unmanned aerial vehicle includes a communications unit, configured to receive information and transfer the received information to the processor, and further configured to send 180-degree image information respectively obtained by the first camera and the second camera simultaneously.

To resolve the foregoing technical problems, embodiments of the present invention provide a control method for an unmanned aerial vehicle, including:

receiving gimbal operation information, where the gimbal operation information is used to instruct working of a gimbal, so that a first camera and a second camera turn to predefined directions to reach predefined locations and attitudes;

obtaining status information of a roll axis motor assembly and a pitch axis motor assembly of the gimbal, where the first camera and the second camera are disposed at two ends of the roll axis motor assembly and face opposite directions and the pitch axis motor assembly is connected to the roll axis motor assembly;

calculating flight attitude information of the gimbal according to the status information and the gimbal operation information;

outputting one or more motor signals according to the flight attitude information;

controlling, according to the one or more motor signals, the roll axis motor assembly and the pitch axis motor assembly to adjust the first camera and the second camera to reach the predefined locations and attitudes; and controlling the first camera and the second camera to respectively obtain 180-degree opposite direction image information simultaneously.

In some embodiments, the control method further includes:

controlling the first camera and the second camera to lock in a particular target or angle;

if an unmanned aerial vehicle is in a moving state or shakes, calculating flight attitude information of the gimbal according to the status information and output one or more motor signals according to the flight attitude information; and controlling, according to the one or more motor signals, the roll axis motor assembly and the pitch axis motor assembly to adjust the first camera and the second camera in real-time, so that the first camera and the second camera always lock in the particular target or angle for photographing.

In some embodiments, the control method further includes:

receiving flight operation information, where the flight operation information is used to instruct flying of the unmanned aerial vehicle; and controlling flying of the unmanned aerial vehicle according to the flight operation information.

Compared with the prior art, in the embodiments of the present invention, the two cameras are respectively disposed at the two ends of the roll axis motor assembly and face opposite directions, so that the two cameras can cooperate with each other, so as to obtain a 360-degree panoramic view at a same time, thereby satisfying three-dimensional experience in virtual reality.

BRIEF DESCRIPTION OF THE DRAWINGS

One or more embodiments are exemplarily described by using the figures in the corresponding accompanying drawings. The exemplary descriptions do not constitute limitations to the embodiments. Elements having same reference numerals in the accompanying drawings represent similar elements, and unless indicated otherwise, the figures in the accompanying drawings do not constitute proportion limitations.

DETAILED DESCRIPTION

For ease of understanding the present invention, the present invention is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", "right" and similar expressions used in this specification are merely used for the purpose of description.

Unless otherwise defined, meanings of all technical and scientific terms used in this specification are the same as that usually understood by persons skilled in the technical field to which the present invention belongs. The terms used in this specification of the present invention are merely intended to describe specific implementations rather than limit the present invention. The term "and/or" used in this specification includes any or all combinations of one or more related listed items.

Figure 1:
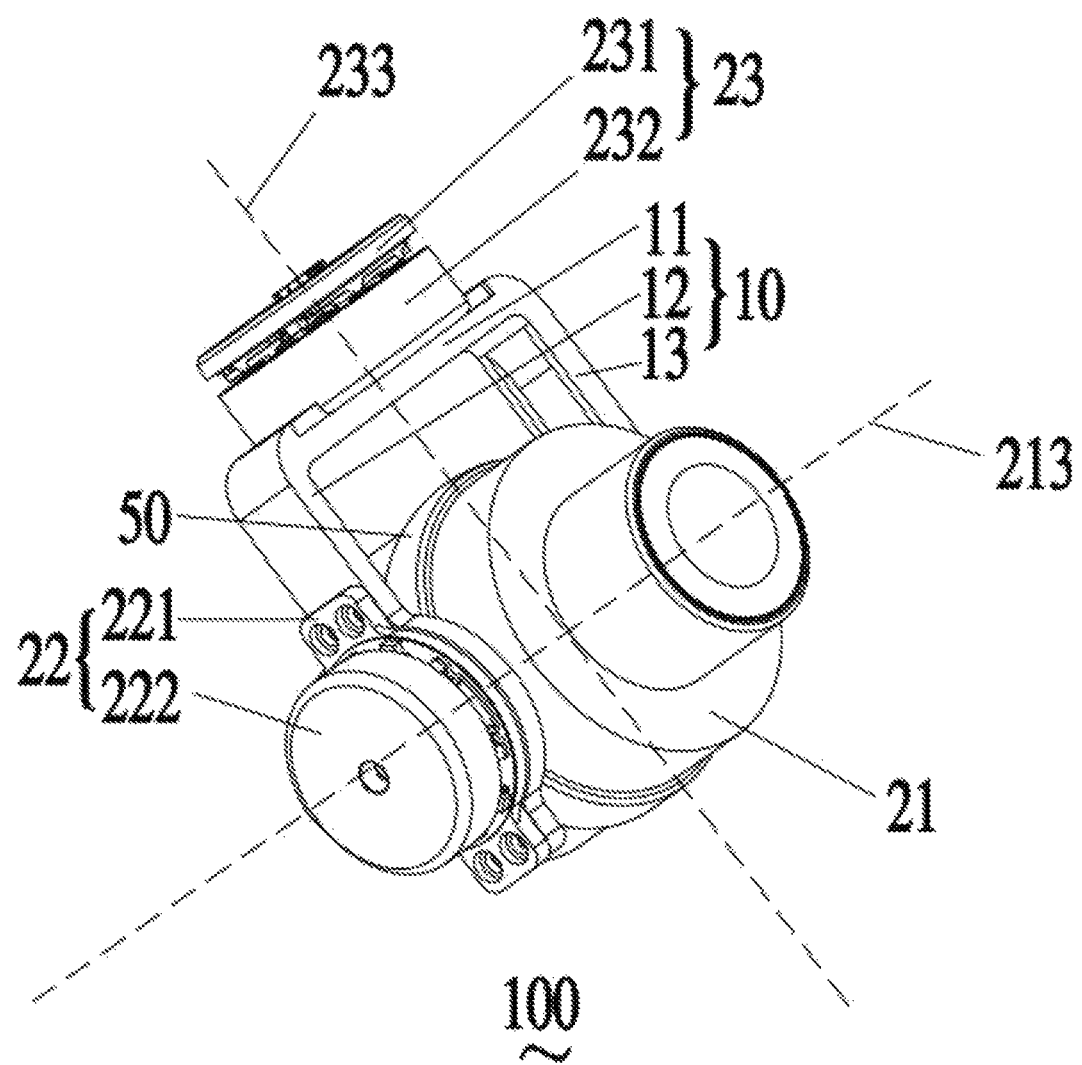
FIG. 1 is a stereogram of a gimbal according to an embodiment of the present invention.
Figure 2:
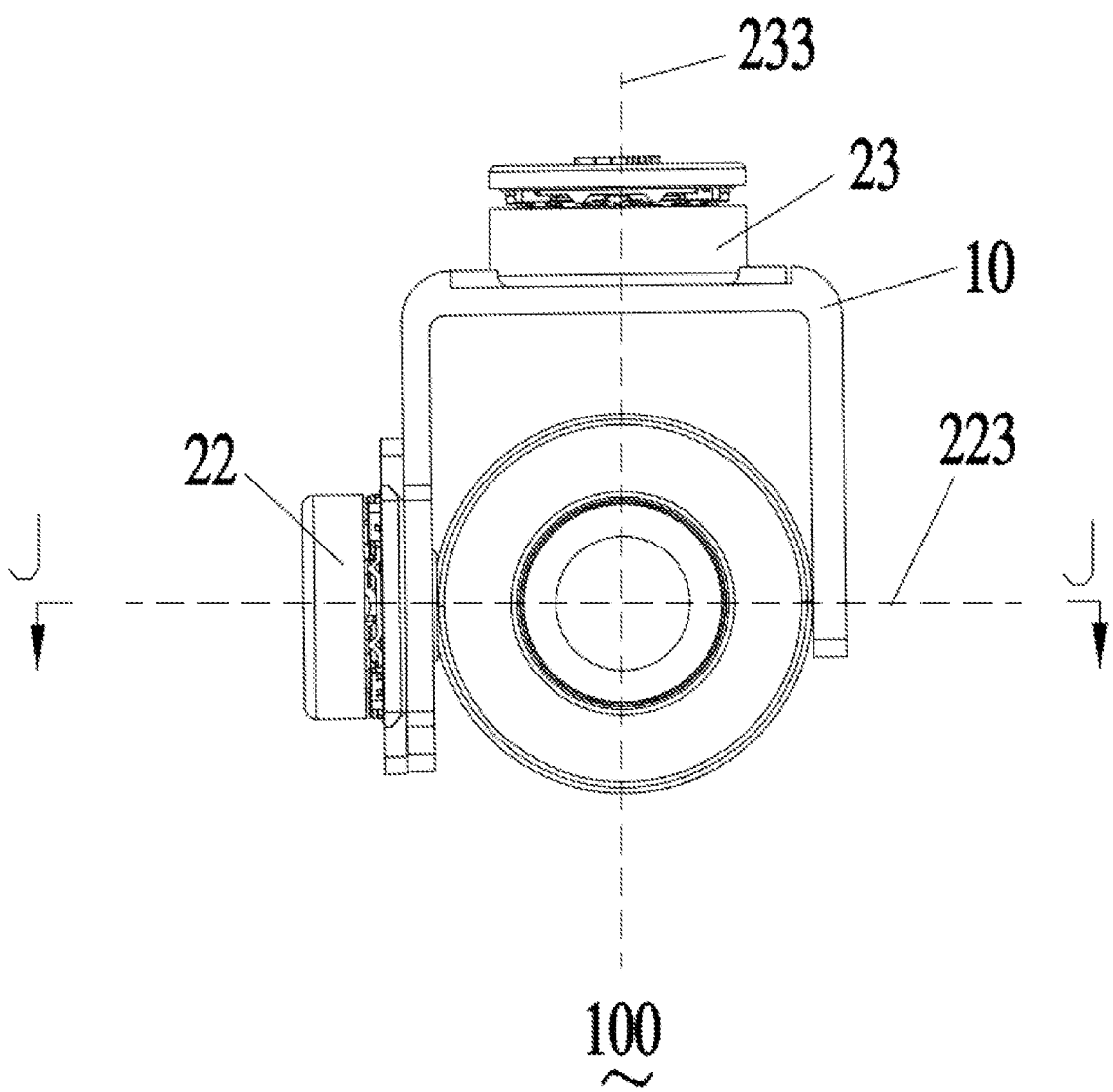
FIG. 2 is a front view of the gimbal shown in FIG. 1.
Figure 3:
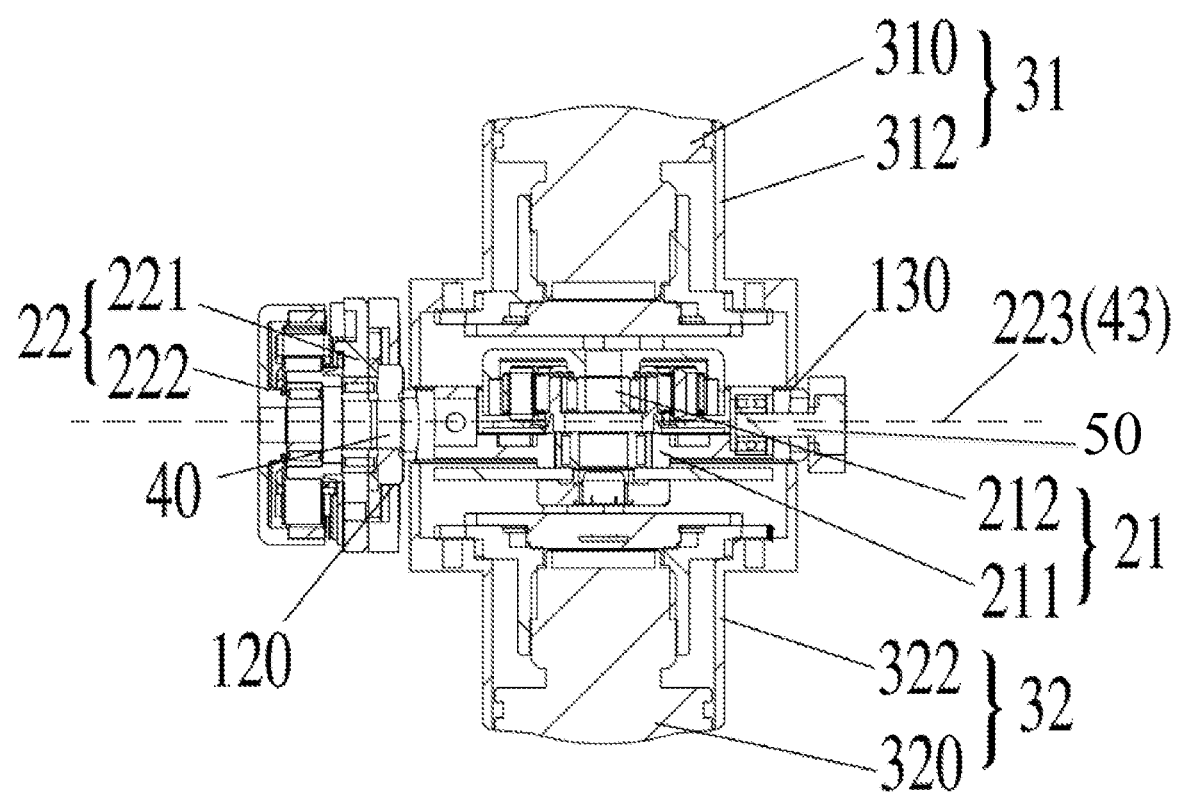
FIG. 3 is a sectional view along J-J of the gimbal shown in FIG. 1.

Referring to FIG. 1 to FIG. 3, FIG. 1 to FIG. 3 are a stereogram, an assembly diagram and a sectional view of a gimbal according to embodiments of the present invention. As shown in FIG. 1 to FIG. 3, the gimbal 100 includes a support 10, a roll axis motor assembly 21, a pitch axis motor assembly 22, a yaw axis motor assembly 23, a first camera 31, a second camera 32 and a connecting shaft arm 40.

The first camera 31 and the second camera 32 are disposed at two ends of the roll axis motor assembly 21 and face opposite directions and the roll axis motor assembly 21 is configured to drive the first camera 31 and the second camera 32 to rotate around a roll axis 213 of the roll axis motor assembly 21. The connecting shaft arm 40 is hinged to the support 10 and is connected to the roll axis motor assembly 21. The pitch axis motor assembly 22 is mounted on the support 10 and is connected to the roll axis motor assembly 21 by using the connecting shaft arm 40. The pitch axis motor assembly 22 is configured to drive the connecting shaft arm 40, the roll axis motor assembly 21, the first camera 31 and the second camera 32 to rotate around a pitch axis 223 of pitch axis motor assembly 22. The yaw axis motor assembly 23 is mounted on the support 10 and is configured to drive the support 10, the pitch axis motor assembly 22, the connecting shaft arm 40, the roll axis motor assembly 21, the first camera 31 and the second camera 32 to rotate around a yaw axis 233 of the roll axis motor assembly 21. The roll axis 213, the pitch axis 223 and the yaw axis 233 are respectively rotation center axes of the roll axis motor assembly 21, the pitch axis motor assembly 22 and the yaw axis motor assembly 23.

In this embodiment, the support 10 is a U-shaped support, including a transverse arm 11, a first side arm 12 and a second side arm 13. The first side arm 12 and the second side aim 13 are vertically connected to two ends of the transverse arm 11. The transverse arm 11 of the support 10 is fixed to a bottom end surface of the yaw axis motor assembly 23. One end of the first side arm 12 and one end of the second side aim 13 are respectively provided with mounting holes 120 and 130. For example, one end that is of the first side arm 12 and that is far away from the transverse arm 11 and one end that is of the second side arm 13 and that is far away from the transverse arm 11 are respectively provided with the mounting holes 120 and 130. The connecting shaft arm 40 is hinged to the support 10 by using the mounting hole 120. The connecting shaft arm 40 is connected to the roll axis motor assembly 21 and the roll axis motor assembly 21 is fixed between the first side arm 12 and the second side arm 13.

The roll axis motor assembly 21 includes a roll axis motor stator 211 and a roll axis motor rotor 212. The roll axis motor stator 211 is located in the middle of the roll axis motor assembly 21 and is directly fixed to the connecting shaft arm 40.

One side that is of the roll axis motor assembly stator 211 and that is close to the second side arm 13 is provided with a mounting hole and one end that is of second side arm 13 and that is far away from the transverse arm 11 is provided with another connecting shaft arm 50. The connecting shaft arm 50 is rotably inserted into the mounting hole by running through the mounting hole 130.

In some embodiments, the connecting shaft arm 50 may be fixedly mounted at one side that is of the roll axis motor assembly stator 211 and that is close to the second side arm 13. The connecting shaft arm 50 runs through the mounting hole 130, to movably mount the roll axis motor assembly stator 211 on the second side arm 13.

The first camera 31 includes a first lens 310 and a first housing 312. The first lens 310 is fixed in the first housing 312 and the first housing 312 is fixed at one end of the roll axis motor rotor 212.

Similarly, the second camera 32 includes a second lens 320 and a second housing 322. The second lens 320 is fixed in the second housing 322 and the second housing 322 is fixed at the other end of the roll axis motor rotor 212. Optical axes of the two lenses 310 and 320 overlap. During use, the first lens 310 and the second lens 320 can implement simultaneous 360-degree capturing.

In some embodiments, there may be an angle between the optical axes of the two lenses 310 and 320 and it needs to be ensured that he first lens 310 and the second lens 320 can implement simultaneous 360-degree capturing.

When rotating, the roll axis motor rotor 212 drives the roll axis motor assembly 21 except the roll axis motor stator 211 and the first camera 31 and the second camera 32 at the two ends of the roll axis motor assembly 21 to rotate around the roll axis 213 relative to the support 10 and the connecting shaft arm 40.

The pitch axis motor assembly 22 includes a pitch axis motor stator 221 and a pitch axis motor rotor 222. The pitch axis motor assembly 22 is located at one side at the bottom of the support 10 and is connected to the roll axis motor assembly 21 by using the connecting shaft arm 40. In this embodiment, the pitch axis motor stator 221 is fixed at an outer side of the first side arm 12 or the second side arm 12. The pitch axis motor rotor 222 is fixedly connected to the connecting shaft arm 40. When rotating, the pitch axis motor rotor 222 drives the roll axis motor assembly 21, the first camera 31 and the second camera 32 to rotate around an axial direction 43 of the connecting shaft arm 40. It should be noted that the pitch axis 223 and the roll axis 213 are perpendicular to each other and the axial direction 43 of the connecting shaft arm 40 and the pitch axis 223 overlap.

In some embodiments, the connecting shaft arm 40 may be omitted. The roll axis motor stator 211 is directly and fixedly connected to the pitch axis motor rotor 222 and the pitch axis motor stator 221 is mounted on the support 10. For example, the pitch axis motor stator 221 is fixedly mounted at one end that is of the first side arm 12 and that is far away from the transverse arm 11.

In some embodiments, the second side arm 13 may be omitted. The pitch axis motor stator 221 is fixedly mounted on the first side arm 12 and the pitch axis motor rotor 222 is connected to the roll axis motor stator 211. For example, the roll axis motor assembly 21, the first camera 31 and the second camera 32 are located at one side of the first side arm 12, the pitch axis motor assembly 22 is located at the other side of the first side arm 12, the pitch axis motor stator 221 is fixedly mounted on the first side arm 12 and the pitch axis motor rotor 222 is connected to the roll axis motor stator 211 by using the connecting shaft arm 40 or is directly connected to the roll axis motor stator 211.

The yaw axis motor assembly 23 includes a yaw axis motor stator 231 and a yaw axis motor rotor 232. The yaw axis motor assembly 23 is located above the support 10 and the bottom end surface of the yaw axis motor assembly 23 is fixedly connected to an upper surface of the transverse arm 11 in the support 10. Specifically, the yaw axis motor stator 231 is configured to connect to an external base or another device and the yaw axis motor rotor 232 is fixedly connected to the upper surface of the transverse arm 11 in the support 10. When rotating, the yaw axis motor rotor 232 drives the support 10, the roll axis motor assembly 21, the pitch axis motor assembly 22, the first camera 31, the second camera 32 and the connecting shaft arm 40 together to rotate around the yaw axis 233. It should be noted that the yaw axis 233 is respectively perpendicular to the axial direction 43 of the connecting shaft arm 40 and the roll axis 213.

In some embodiments, the yaw axis motor assembly 23 may be omitted and the transverse arm 11 of the support 10 is configured to directly connect to the external base or the another device.

The gimbal 100 further includes a retaining ring 50 and the retaining ring 50 is circular ring-shaped and is sleeved over the middle of the roll axis motor assembly 21. A side wall of the retaining ring 50 is provided with a rectangular through hole and the connecting shaft arm 40 is fixedly connected to the roll axis stator 211 by running through the rectangular through hole 51. The retaining ring 50 is fixed at a gap in the middle of the roll axis motor assembly 21 and is configured to stop foreign matters such as water and dust in the outside from entering the inside of the roll axis motor assembly 21 by using the gap, thereby improving the service lives of the roll axis motor assembly 21 and the gimbal 100.

In this embodiment, the first camera 31 and the second camera 32 are respectively fixed at the two ends of the roll axis motor assembly 21. Therefore, relative movement or rotation of the first camera 31 and the second camera 32 does not occur. During photographing, no time difference is generated. In addition, view angles of the first camera 31 and the second camera 32 are approximately 180 degrees and are in opposite directions. The first camera 31 and the second camera 32 may complete 360-degree panoramic view photographing together, to ensure to obtain a 360-degree panoramic image at a same time, thereby satisfying three-dimensional experience in virtual reality. Further, because the gimbal 100 is provided with two cameras, namely, the first camera 31 and the second camera 32, the gimbal 100 may implement a task that needs to be implemented by using a plurality of gimbals, thereby reducing the number of required gimbals and saving costs.

In some embodiments, to better protect the roll axis motor assembly 21 and simplify the structure of the gimbal 100, the side wall of the retaining ring 50 may not be provided with the rectangular through hole any longer. The roll axis motor stator 211 is fixedly connected to an inner surface of the side wall of the retaining ring 50 and one end of the connecting shaft arm 40 is fixedly connected to an outer surface of the side wall of the retaining ring 50. When rotating, the roll axis motor rotor 212 drives the roll axis motor assembly 21 except the roll axis motor stator 211 and the first camera 31 and the second camera 32 at the two ends of the roll axis motor assembly 21 to rotate around an axial direction 213 of the roll axis motor rotor 212 relative to the retaining ring 50.

In some embodiments, the support 10 may include the transverse arm 11 and the first side arm 12. One end of the first side arm 12 is fixedly connected to one end or a bottom surface of the transverse arm 11 and the upper surface of the transverse arm 11 is fixedly connected to the bottom end surface of the yaw axis motor assembly 23. The roll axis motor assembly 21, the first camera 31 and the second camera 32 are located at one side of the first side arm 12 and the pitch axis motor assembly 22 is located at the other side of the first side arm 12. A bottom end of the first side arm 12 (that is, one end that is far away from the transverse arm 11) is provided with a mounting hole 120 and the connecting shaft arm 40 is hinged to the support 10 by running through the mounting hole 120. One end of the connecting shaft arm 40 is fixedly connected to an axial end surface of the pitch axis motor assembly 22 and the other end is fixedly connected to a side surface of the roll axis motor assembly 21.

In some embodiments, the support 10 may be long-strip-shaped. One end of the support 10 is fixedly connected to the bottom end surface of the yaw axis motor assembly 23. The roll axis motor assembly 21, the first camera 31 and the second camera 32 are located at one side of the support 10 and the pitch axis motor assembly 22 is located at the other side of the support 10. A bottom end of the support 10 is provided with a through hole and the connecting shaft arm 40 is hinged to the support 10 by running through the through hole. One end of the connecting shaft arm 40 is fixedly connected to the axial end surface of the pitch axis motor assembly 22 and the other end is fixedly connected to the side surface of the roll axis motor assembly 21.

In some embodiments, the gimbal 100 may further be applicable to be mounted on or connected to a movable object, for example, a power-driven vehicle or boat, a non-power driven vehicle or boat, an unmanned aerial vehicle, a robot, a human body, an animal body, or a similar object. For example, the gimbal may be mounted on the unmanned aerial vehicle by using a base.

In some embodiments, at least one motor of the roll axis motor assembly 21, the pitch axis motor assembly 22 and the yaw axis motor assembly is implemented by using a brushless direct current motor. The brushless direct current motor has the following advantages: (1) Performance is reliable, wear is reduced and/or a faulty rate is reduced; and in addition, because the brushless direct current motor has an electronic commutator instead of a mechanical commutator, the brushless direct current motor has a longer (approximately six times) service life than that of a brush motor. (2) The current is low-load or no-load current because the brushless direct current motor is a static motor. (3) The efficiency is high. (4) The volume is small. In various embodiments, motors of other types may alternatively be used to replace the brushless direct current motor.

In the foregoing embodiments, the roll axis motor assembly 21 directly drives the roll axis motor rotor 212 and the first camera 31 and the second camera 32 that are located at the two ends of the roll axis motor assembly 21 to rotate around the roll axis 213, the pitch axis motor assembly 22 directly drives the connecting shaft arm 40 to rotate around the pitch axis 223 and the yaw axis motor assembly 23 directly drives the support 10 to rotate around the yaw axis 233. Compared with a mechanical transmission manner, a direct drive motor (such as a compact motor or a micro motor) provides at least the following advantages: (1) The direct drive motor generally requires relatively less energy (electricity quantity), so that a energy usage ratio is improved and the environment is protected. (2) The motor may be controlled in a stepless manner, so that a respond time is reduced and adjustments may be rapidly and timely performed to respond to changes of different attitudes of the gimbal 100. Therefore, stability of the first camera 31 and the second camera 32 may be improved.

Figure 4:
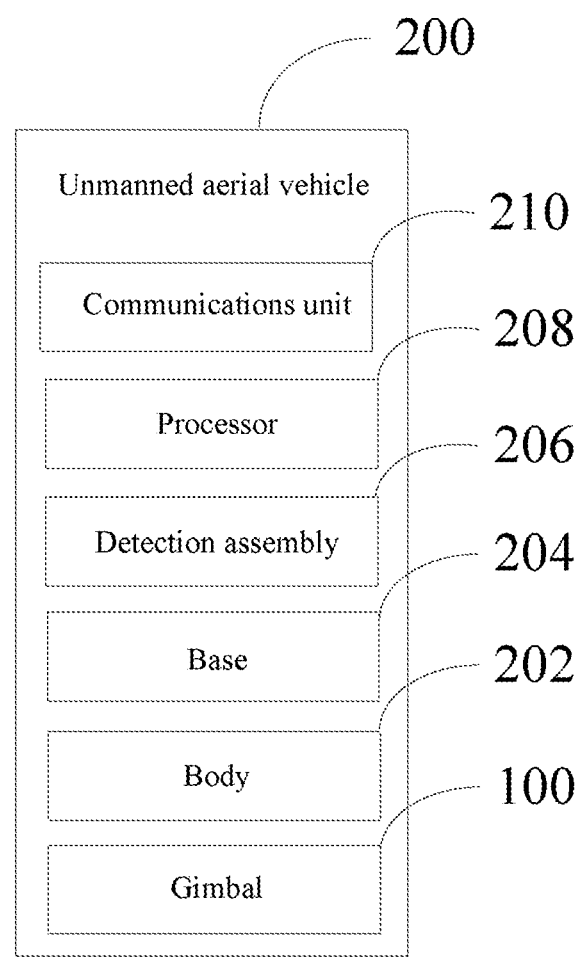
FIG. 4 is a schematic structural diagram of an unmanned aerial vehicle according to an embodiment of the present invention.

Referring to FIG. 4, an embodiment of the present invention provides an unmanned aerial vehicle 200, including a body 202, a base 204, a detection assembly 206, a processor 208, a communications unit 210 and the gimbal 100 shown in FIG. 1 to FIG. 3.

The gimbal 100 is mounted on the body 202 by using the base 204.

The detection assembly 206 is configured to detect or obtain status information of the gimbal 100, for example, status information of the support 10, the roll axis motor assembly 21, the pitch axis motor assembly 22, the yaw axis motor assembly 23, the first camera 31, the second camera 32 and the connecting shaft arm 40. The detection assembly 206 may include an inertial measurement unit, a compass, a GPS transceiver, a speed sensor, a measurement element of another type or a sensor of another type. For example, the detection assembly 206 may include one or more gyroscopes used to detect an angular velocity and/or one or more linear or angular accelerometers used for detecting. The status information may include an angle, a linear velocity, acceleration, location information and similar information of the gimbal 100, for example, angles, linear velocities, acceleration, location information and the like of the support 10, the roll axis motor assembly 21, the pitch axis motor assembly 22, the yaw axis motor assembly 23, the first camera 31, the second camera 32 and the connecting shaft arm 40.

In some embodiments, the status information further includes status information of at least one rotation shaft of the gimbal 100, that is, status information of the roll axis 213, the pitch axis 223 and the yaw axis 233, for example, angles, linear velocities, acceleration and the like of the roll axis 213, the pitch axis 223 and the yaw axis 233.

The processor 208 is configured to calculate flight attitude information of the gimbal 100 according to the status information and output one or more motor signals according to the flight attitude information. The flight attitude information may include directions or inclination angles, speeds and/or acceleration and the like of the roll axis 213, the pitch axis 223 and the yaw axis 233 and directions or inclination angles, speeds and/or acceleration and the like of the support 10, the roll axis motor assembly 21, the pitch axis motor assembly 22, the yaw axis motor assembly 23, the first camera 31, the second camera 32 and the connecting shaft arm 40 relative to the roll axis 213, the pitch axis 223 and the yaw axis 233. In some cases, the flight attitude information may be calculated based on angular velocity information. In some cases, the flight attitude information may be calculated based on both angular velocity information and linear acceleration information. For example, the linear acceleration information may be used to modify and/or correct the angular velocity information.

The processor 208 may generate the one or more motor signals based on the flight attitude information. The motor signal is used to forward or backward rotate or to adjust rotational speeds of the roll axis motor assembly 21, the pitch axis motor assembly 22 and the yaw axis motor assembly 23. The roll axis motor assembly 21, the pitch axis motor assembly 22 and the yaw axis motor assembly 23 may correspondingly rotate according to the one or more motor signals, so that the first camera 31 and the second camera 32 may rotate around at least one of the pitch axis 223, the roll axis 213 and the yaw axis 233. The rotation may cause the first camera 31 and the second camera 32 to turn to predefined directions and locations or remain at predefined locations or predefined attitudes.

The first camera 31 and the second camera 32 that face opposite directions respectively obtain 180-degree opposite direction image information simultaneously at the predefined locations or attitudes.

The communications unit 210 is configured to obtain the 180-degree opposite direction image information and send the 180-degree opposite direction image information to a server used for image processing. The server combines the 180-degree opposite direction image information into 360-degree stereoscopic image information.

In some embodiments, the processor 208 may control the first camera 31 and the second camera 32 to lock in a particular target or angle for photographing. For example, image information of the particular target may be obtained by analyzing the image information obtained by the first camera 31 and the second camera 32. The processor 208 controls, by comparing the real-time image information obtained by the first camera 31 and the second camera 32 and the image information of the particular target, the first camera 31 and the second camera 32 to lock in the particular target for photographing.

When the first camera 31 and the second camera 32 lock in the particular target or angle for photographing, if the unmanned aerial vehicle 200 is in a moving state or shakes, the processor 208 may calculate flight attitude information of the gimbal 100 according to the status information of the gimbal 100 and output one or more motor signals according to the flight attitude information.

The roll axis motor assembly 21, the pitch axis motor assembly 22 and the yaw axis motor assembly 23 may correspondingly rotate according to the one or more motor signals, so that the first camera 31 and the second camera 32 may rotate around at least one of the pitch axis 223, the roll axis 213 and the yaw axis 233. Therefore, the first camera 31 and the second camera 32 always lock in the particular target or angle for photographing.

In this embodiment, the first camera 31 and the second camera 32 of the unmanned aerial vehicle 200 are respectively disposed at the two ends of the roll axis motor assembly 21 and face opposite directions. Therefore, relative movement or rotation of the first camera 31 and the second camera 32 does not occur. During photographing, no time difference is generated. In addition, view angles of the first camera 31 and the second camera 32 are approximately 180 degrees and are in opposite directions. The first camera 31 and the second camera 32 may complete 360-degree panoramic view photographing together, to ensure to obtain a 360-degree panoramic image at a same time, thereby satisfying three-dimensional experience in virtual reality. Further, because the gimbal 100 is provided with two cameras, namely, the first camera 31 and the second camera 32, the gimbal 100 may implement a task that needs to be implemented by using a plurality of gimbals, thereby reducing the number of required gimbals and saving costs.

Figure 5:
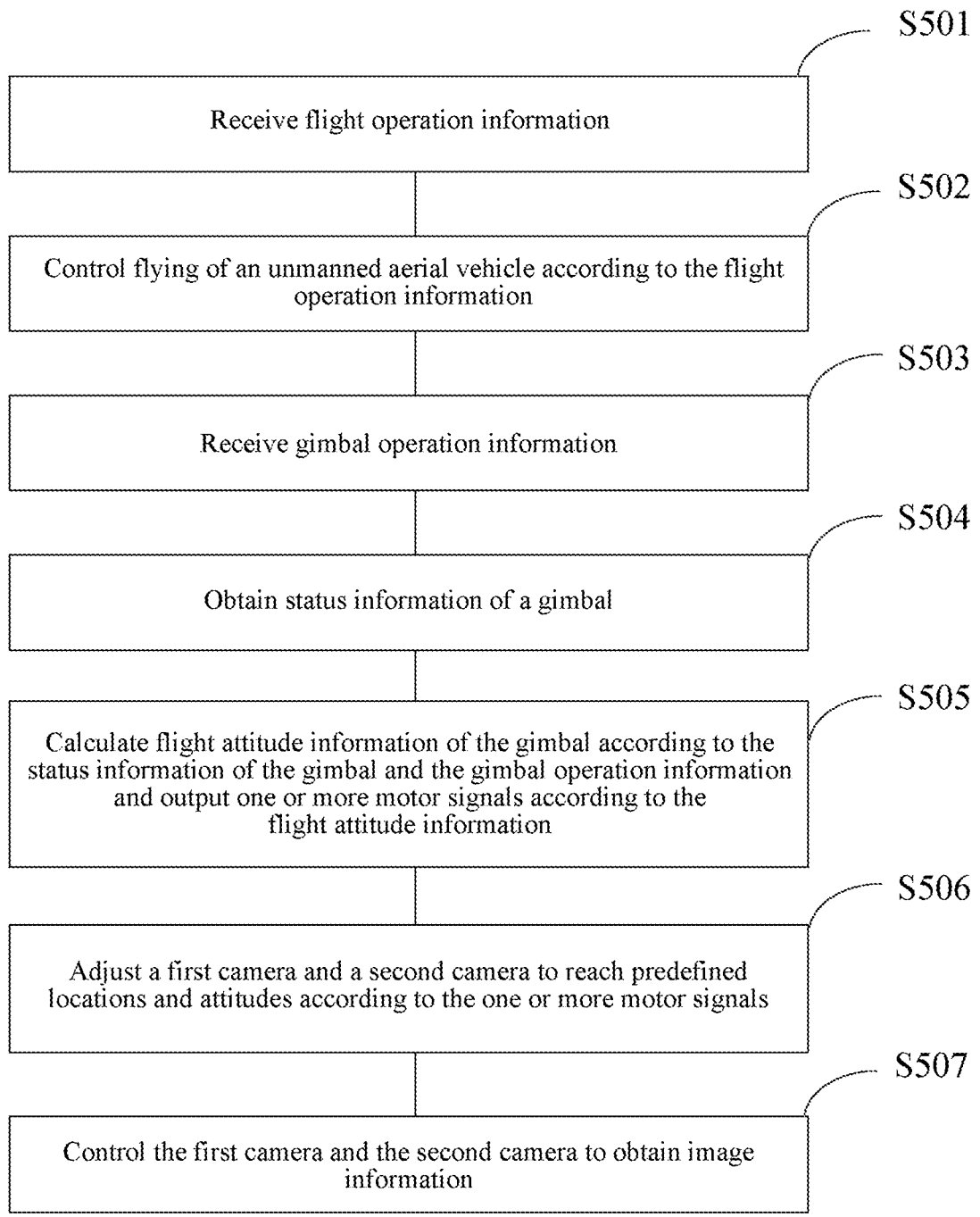
FIG. 5 is a flowchart of a control method for an unmanned aerial vehicle according to an embodiment of the present invention.

Referring to FIG. 5, an embodiment of the present invention provides a control method for the unmanned aerial vehicle 200. The control method includes the following steps:

S501: Receive flight operation information.

The unmanned aerial vehicle 200 receives the flight operation information by using the communications unit 210. The flight operation information is used to instruct flying of the unmanned aerial vehicle 200. For example, a user sends the flight operation information to the unmanned aerial vehicle 200 by using a remote control, instructing the unmanned aerial vehicle 200 to fly to a predefined location.

S502. Control flying of the unmanned aerial vehicle according to the flight operation information.

The processor 208 obtains the flight operation information received by the communications unit 210, to control flying of the unmanned aerial vehicle 200.

S503: Receive gimbal operation information.

The communications unit 210 receives the gimbal operation information, and the gimbal operation information instructs working of the gimbal 100, so that the first camera 31 and the second camera 32 turn to predefined directions to reach predefined locations and attitudes. For example, if the user wants to photograph a target, the user may use the remote control to send the gimbal operation information to the unmanned aerial vehicle 200.

S504: Obtain status information of the gimbal.

The detection assembly 206 detects or obtains the status information of the gimbal 100, for example, angles, linear velocities, acceleration, location information and the like of the support 10, the roll axis motor assembly 21, the pitch axis motor assembly 22, the yaw axis motor assembly 23, the first camera 31, the second camera 32 and the connecting shaft arm 40; and angles, linear velocities, acceleration and the like of the roll axis 213, the pitch axis 223 and the yaw axis 233.

S505. Calculate flight attitude information of the gimbal according to the status information of the gimbal and the gimbal operation information and output one or more motor signals according to the flight attitude information.

The processor 208 calculates the flight attitude information of the gimbal 100 according to the status information and the gimbal operation information and outputs the one or more motor signals according to the gimbal operation information.

S506: Adjust the first camera and the second camera to reach predefined locations and attitudes according to the one or more motor signals.

The roll axis motor assembly 21, the pitch axis motor assembly 22 and the yaw axis motor assembly 23 rotate forward or backward or adjust their rotational speeds according to the one or more motor signals, to adjust the first camera 31 and the second camera 32 to reach the predefined locations and attitudes.

S507: Control the first camera and the second camera to obtain image information.

The communications unit 210 receives photographic operation information. The photographic operation information instructs the first camera 31 and the second camera 32 to start to obtain the image information. For example, the user sends the photographic operation information to the unmanned aerial vehicle 200 by using the remote control. After the communications unit 210 receives the photographic operation information, the photographic operation information is processed by the processor 208 and the first camera 31 and the second camera 32 respectively obtain 180-degree opposite direction image information simultaneously at the predefined locations and attitudes.

The communications unit 210 obtains the 180-degree opposite direction image information and sends the 180-degree opposite direction image information to a server used for image processing. The server combines the 180-degree opposite direction image information into 360-degree stereoscopic image information.

Figure 6:
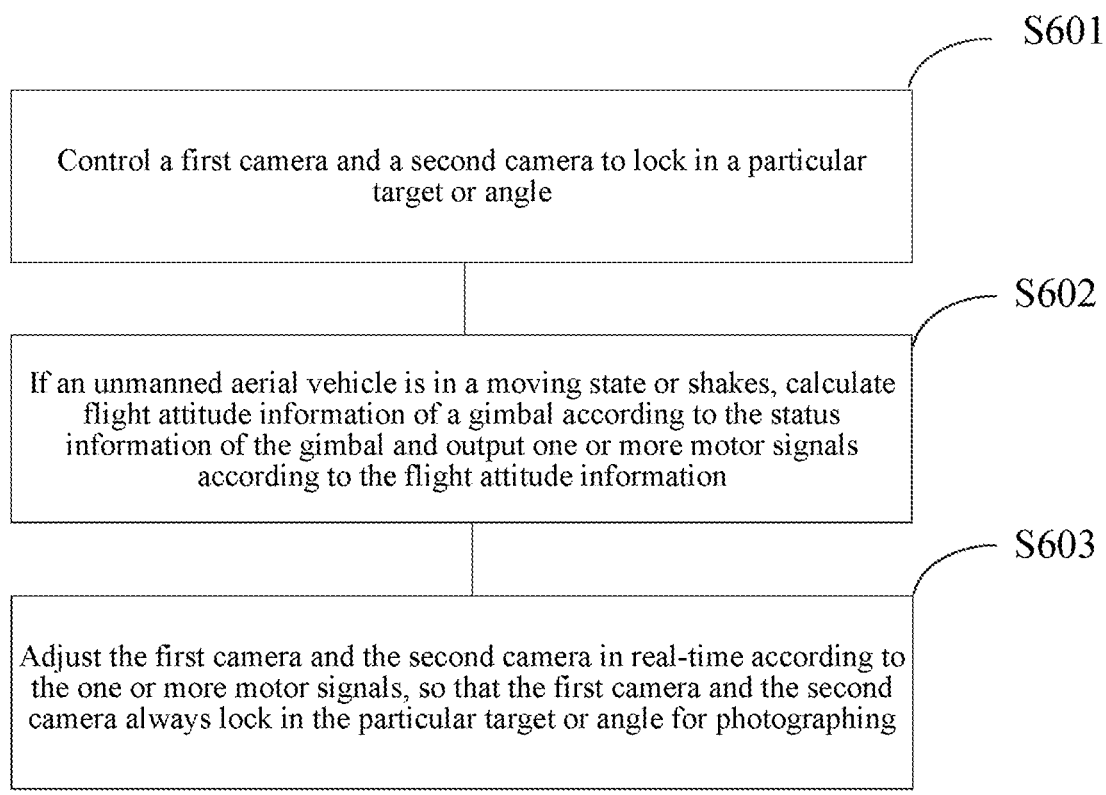
FIG. 6 is a flowchart of a control method for an unmanned aerial vehicle according to some other embodiments of the present invention.

Referring to FIG. 6, in some embodiments, the control method for the unmanned aerial vehicle 200 further includes:

S601: Control the first camera and the second camera to lock in a particular target or angle.

The processor 208 may control the first camera 31 and the second camera 32 to lock in the particular target or angle for photographing. For example, image information of the particular target may be obtained by analyzing the image information obtained by the first camera 31 and the second camera 32. The first camera 31 and the second camera 32 are controlled, by comparing the real-time image information obtained by the first camera 31 and the second camera 32 and the image information of the particular target, to lock in the particular target for photographing.

S602: If the unmanned aerial vehicle is in a moving state or shakes, calculate flight attitude information of the gimbal according to the status information of the gimbal and output one or more motor signals according to the flight attitude information.

If the unmanned aerial vehicle 200 is in a moving state or shakes, the processor 208 calculates flight attitude information of the gimbal 100 according to the status information of the gimbal 100 and output one or more motor signals according to the flight attitude information.

S603: Adjust the first camera and the second camera in real-time according to the one or more motor signals, so that the first camera and the second camera always lock in the particular target or angle for photographing.

The roll axis motor assembly 21, the pitch axis motor assembly 22 and the yaw axis motor assembly 23 may correspondingly rotate according to the one or more motor signals, so that the first camera 31 and the second camera 32 may rotate around at least one of the pitch axis 223, the roll axis 213 and the yaw axis 233. Therefore, the first camera 31 and the second camera 32 always lock in the particular target or angle for photographing.

In this embodiment, the first camera 31 and the second camera 32 of the unmanned aerial vehicle 200 are respectively disposed at the two ends of the roll axis motor assembly 21 and face opposite directions. Therefore, relative movement or rotation of the first camera 31 and the second camera 32 does not occur. When the first camera 31 and the second camera 32 are controlled to take photographs, no time difference is generated. In addition, view angles of the first camera 31 and the second camera 32 are approximately 180 degrees and are in opposite directions. The first camera 31 and the second camera 32 may complete 360-degree panoramic view photographing together, to ensure to obtain a 360-degree panoramic image at a same time, thereby satisfying three-dimensional experience in virtual reality. Further, because the gimbal 100 is provided with two cameras, namely, the first camera 31 and the second camera 32, the gimbal 100 may implement a task that needs to be implemented by using a plurality of gimbals, thereby reducing the number of required gimbals and saving costs.

It should be finally noted that, the foregoing embodiments are merely intended for describing the technical solutions of the present invention, rather than limiting the present invention. According to concepts of the present invention, technical features in the foregoing embodiments or different embodiments may also be combined, steps may be implemented in any sequence, and there may be many other variations of the present invention in different aspects. For simplicity, the variations are not provided in details. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A gimbal, comprising:
   a support;
   a first camera;
   a second camera;
   a roll axis motor assembly, wherein the roll axis motor assembly comprises a roll axis motor stator hinged to the support and a roll axis motor rotor configured to rotate around a roll axis relative to the roll axis motor stator, the roll axis motor stator being located in the middle of the roll axis motor assembly, the first camera and the second camera being disposed at two ends of the roll axis motor rotor and face opposite directions, wherein the roll axis motor assembly is configured to drive the first camera and the second camera to rotate around the roll axis of the roll axis motor assembly; and
   a pitch axis motor assembly, mounted on the support and connected to the roll axis motor stator, wherein the pitch axis motor assembly is configured to drive the roll axis motor assembly, the first camera and the second camera to rotate around a pitch axis of pitch axis motor assembly.

2. The gimbal according to claim 1, wherein the pitch axis motor assembly comprises a pitch axis motor stator and a pitch axis motor rotor configured to rotate about the pitch axis relative to the pitch axis stator, the pitch axis stator being mounted on the support and the pitch axis motor rotor being fixedly connected to the roll axis motor stator.

3. The gimbal according to claim 2, wherein the pitch axis motor rotor is fixedly connected to the roll axis motor stator by using a connecting shaft arm, wherein the connecting shaft arm extends through the support, two ends of the connecting shaft arm are fixed with the pitch axis motor rotor and the roll axis motor stator.

4. The gimbal according to claim 2, wherein the pitch axis motor rotor is fixedly connected to the roll axis motor stator directly.

5. The gimbal according to claim 1, wherein the pitch axis and the roll axis are perpendicular to each other.

6. The gimbal according to claim 1, wherein the first camera comprises a first housing and a first lens, the first lens being fixed in the first housing and the first housing being fixed at one end of the roll axis motor rotor.

7. The gimbal according to claim 6, wherein the second camera comprises a second housing and a second lens, the second lens being fixed in the second housing and the second housing being fixed at the other end of the roll axis motor rotor.

8. The gimbal according to claim 1, wherein optical axes of the first camera and the second camera overlap.

9. The gimbal according to claim 1, wherein the gimbal further comprises a yaw axis motor assembly, the yaw axis motor assembly being mounted on the support and the yaw axis motor assembly being configured to drive the support, the pitch axis motor assembly, the roll axis motor assembly, the first camera and the second camera to rotate around a yaw axis of the yaw axis motor assembly.

10. The gimbal according to claim 9, wherein the yaw axis motor assembly comprises a yaw axis motor stator and a yaw axis motor rotor configured to rotate around the yaw axis relative to the yaw axis motor stator, the yaw axis motor rotor being fixedly connected to the support and the yaw axis motor stator is configured to connect to an external base or another device.

11. The gimbal according to claim 1, wherein the support comprises a transverse arm and a first side arm, the first side arm being connected to two end of the transverse arm respectively; and
    the gimbal further comprises a yaw axis motor assembly, the yaw axis motor assembly being mounted on the transverse arm, one end of the first side arm being coupled to the pitch axis motor assembly and one end of the second side arm being hinged to the roll axis motor stator.

12. The gimbal according to claim 11, wherein the yaw axis motor assembly comprises a yaw axis motor stator and a yaw axis motor rotor configured to rotate about a yaw axis, the yaw axis motor rotor is fixedly mounted on the transverse arm.

13. The gimbal according to claim 11, wherein the pitch axis motor assembly comprises a pitch axis motor stator and a pitch axis motor rotor configured to rotate about the pitch axis relative to the pitch axis motor stator, the end of the first side arm is fixed with the pitch axis motor stator.

14. The gimbal according to claim 11, wherein one side that is of the roll axis motor stator and that is close to the second side arm is provided with a connecting shaft arm, the end of second side arm being provided with a mounting hole, the connecting shaft arm being rotably inserted into the mounting hole.

15. The gimbal according to claim 11, wherein one side that is of the roll axis motor assembly stator and that is close to the second side aim is provided with a mounting hole and the end of the second side arm which is far away from the transverse arm is provided with a connecting shaft arm, the connecting shaft arm being rotably inserted into the mounting hole.

16. A control method for an unmanned aerial vehicle, comprising:
    receiving gimbal operation information used to instruct working of a gimbal, wherein the gimbal comprises a roll axis motor assembly, a pitch axis motor assembly connected to the roll axis motor assembly, a first camera and a second camera, the first camera and the second camera being disposed at two ends of the roll axis motor assembly, wherein the first camera and the second camera turn to predefined directions to reach predefined locations and attitudes according to the gimbal operation information;
    obtaining status information of the roll axis motor assembly and the pitch axis motor assembly of the gimbal;
    calculating flight attitude information of the gimbal according to the status information and the gimbal operation information;
    outputting one or more motor signals according to the flight attitude information;
    controlling, according to the one or more motor signals, the roll axis motor assembly and the pitch axis motor assembly to adjust the first camera and the second camera to reach the predefined locations and attitudes; and
    controlling the first camera and the second camera to respectively obtain 180-degree opposite direction image information simultaneously.

17. The control method according to claim 16, further comprising:
    controlling the first camera and the second camera to lock in a particular target or angle;

if an unmanned aerial vehicle is in a moving state or shakes, calculating flight attitude information of the gimbal according to the status information and output one or more motor signals according to the flight attitude information; and controlling, according to the one or more motor signals, the roll axis motor assembly and the pitch axis motor assembly to adjust the first camera and the second camera in real-time, so that the first camera and the second camera always lock in the particular target or angle for photographing.

18. The control method according to claim 17, further comprising:

receiving flight operation information, wherein the flight operation information is used to instruct flying of the unmanned aerial vehicle; and controlling flying of the unmanned aerial vehicle according to the flight operation information.

* * * * *